United States Patent [19]
Litman

[11] 3,936,137
[45] Feb. 3, 1976

[54] ILLUMINATED RETICLE PROJECTION SYSTEM

[75] Inventor: Alan Litman, Pittsburgh, Pa.

[73] Assignee: Smith & Wesson Chemical Company, Inc., Rock Creek, Ohio

[22] Filed: July 3, 1974

[21] Appl. No.: 485,559

[52] U.S. Cl. .................................. 350/10; 356/252
[51] Int. Cl.² ........................................ G02B 27/32
[58] Field of Search .......... 356/252, 251, 250, 247, 356/253–255; 350/10, 55, 174, 202; 33/246, 298, 241; 354/219–225, 54–57, 61; 240/2 F, 2 M

[56] References Cited
UNITED STATES PATENTS

| 1,616,660 | 2/1927 | Henderson | 350/10 |
| 2,094,623 | 10/1937 | Stokey | 356/247 |
| 2,625,742 | 1/1953 | Rawlings | 33/298 |
| 3,552,819 | 1/1971 | Mandler | 350/10 |
| 3,836,263 | 9/1974 | Rickert | 350/174 |
| 3,854,037 | 12/1974 | Feldman et al. | 356/247 |

FOREIGN PATENTS OR APPLICATIONS

| 431,371 | 7/1935 | United Kingdom | 356/251 |

Primary Examiner—John K. Corbin
Assistant Examiner—Jon W. Henry
Attorney, Agent, or Firm—Patrick J. Walsh

[57] ABSTRACT

The illuminated reticle projection system includes a frame comprised of an annulus for mounting the frame about the objective lens assembly of a night vision device and a reticle projector for projecting a reticle image through the objective lens assembly for coincidence with the image focus at an image plane. The projector includes a light emitting diode which illuminates a reticle mask and projects a reticle image through a projection lens into the entrance pupil of the objective lens. The projector is carried by an elevation platform connected to an azimuth platform for pivotal movement in a vertical plane about a horizontal axis. The azimuth platform is, in turn, connected to the frame for pivotal movement in a horizontal plane about a vertical axis. Elevation and azimuth adjustment screw knobs are provided for adjusting the angular position of the elevation and azimuth platforms to effect angular displacement of the reticle projector about vertical and/or horizontal axes and hence vertical and/or horizontal displacement of the reticle image in the night vision equipment.

6 Claims, 6 Drawing Figures

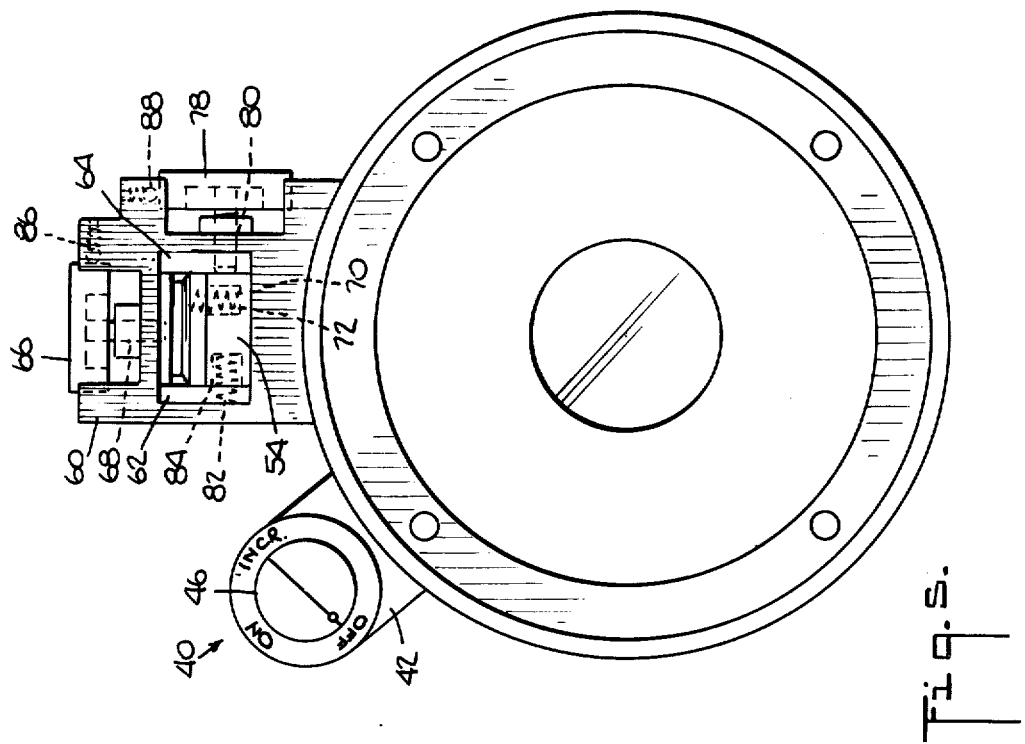
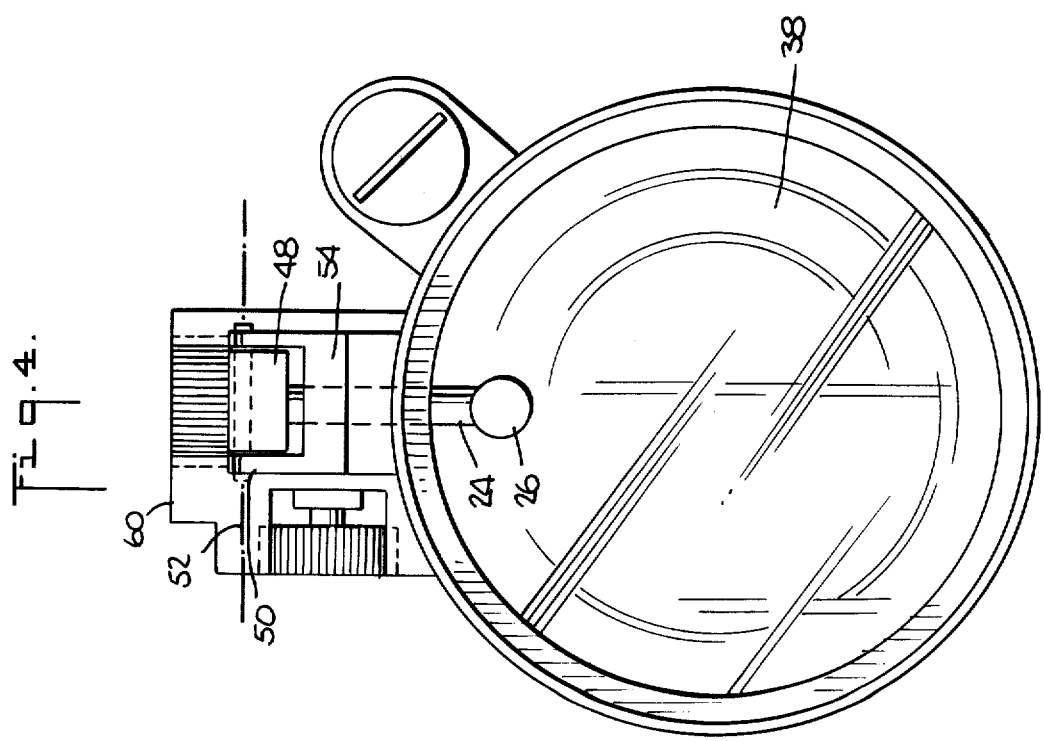

ILLUMINATED RETICLE PROJECTION SYSTEM

The present invention relates to an illuminated reticle or aiming point for night vision equipment and particularly relates to an illuminated reticle adjustable in azimuth and elevation for use particularly with passive intensification-type, electro-optical night vision equipment.

Illuminated reticles for use with night vision equipment have been proposed and constructed in the past. One such illuminated reticle is provided by an edge-lit movable plastic plate positioned over the photocathode at the image plane of an objective lens. Other types of illuminated reticles are very often mounted within cored-out objective lens assemblies which may or may not be adjustable in azimuth or elevation. Another type of illuminated reticle for night vision is described and illustrated in U.S. Pat. No. 3,552,819. In all of these illuminated reticles, manufacturing costs are considerable. For example, to provide such reticles, mechanical assemblies very often must be placed within the objective lens assemblies and appropriately sealed. In certain types of illuminated reticles, the glass objective lens elements must be bored. In most such illuminated reticles, the objective lens assembly must be disassembled and reassembled. This requires skilled work at a factory site which also prevents field installation or service of the illuminated reticles. Still further, many such illuminated reticles are not of the type which can be adjusted in either azimuth or elevation or both.

The present invention provides an illuminated reticle projection system which minimizes or eliminates the foregoing and other disadvantages associated with prior illuminated reticles projection systems and provides a novel and improved illuminated reticle projection system having various advantages in construction, mode of operation and use in comparison with such prior illuminated reticle projection systems. The present illuminated reticle projection system is particularly useful for passive intensification-type, electro-optical night vision equipment. Also, the present illuminated reticle projection system provides a novel mounting therefor affording adjustment in elevation or azimuth or both as desired. Particularly, the illuminated reticle projection system of the present invention includes a reticle projector carried by a frame comprised in part of an annular hood for mounting the projection system to the night vision equipment, particularly for mounting the system adjacent the entrance aperture of the objective lens assembly of the night vision equipment. The reticle projector is carried by the frame on discrete elevation and azimuth platforms and projects substantially radially inwardly within the annular hood to lie at the entrance aperture of the objective lens assembly of the night vision equipment of which the objective lens assembly forms a part. More particularly, the reticle projector comprises a light source, for example a light-emitting diode, for illuminating a reticle mask which carries a transparent reticle against an opaque background. The recticle image projected through the mask by the light source passes through a projection lens wherein the reticle image is projected at an infinite conjugate (collimated) into the entrance pupil of the objective lens. The objective lens assembly of the night vision equipment may be refractive, catoptic or catadioptric or combinations thereof and, in either case, the image focus received through the objective lens assembly and the reticle projector focus coincide at an image plane. In one form of night vision equipment, the image plane constitutes a fiber-optic face plate for transmission of the coincient object and reticle images to a remote photo cathode.

The reticle projector is carried by an elevation platform connected to an azimuth platform for pivotal movement in a vertical plane about a horizontal axis. The azimuth platform is, in turn, connected to the frame for pivotal movement in a horizontal plane about a vertical axis. An elevation adjustment screw is threaded to the frame for bearing engagement with an upper surface of the elevation platform at a location remote from its pivotal axis. A spring cooperates between the elevation platform and the frame to bias the elevation platform into following engagement with the elevation adjustment screw. Similarly, an azimuth adjustment screw is threaded to the frame for engagement against one side of the azimuth platform. A spring cooperates between the frame and the opposite side of the azimuth platform to bias the platform into following engagement with the azimuth adjustment screw. Consequently, by threading or unthreading the elevation and/or azimuth adjustment screws, the reticle projector can be angularly displaced vertically and/or horizontally to effect corresponding vertical and/or horizontal displacement of the reticle image at the image plane in the night vision equipment.

In use, the annular frame can be slipped about the objective lens assembly adjacent its entrance aperture and retaining screws may be used to retain the frame on the lens assembly. The reticle projector is located forwardly of the first element of the objective lens assembly for projecting the reticle image into the entrance pupil of the objective lens. By manipulation of the elevation and the azimuth adjustment screws, the reticle image at the image plane can be adjusted as necessary.

With the foregoing described illuminated reticle projection system, it will be appreciated that the objective lens of the night vision equipment need not be disassembled or bored or otherwise torn down in order to provide an illuminated reticle for the night vision equipment. Moreover, the foregoing described illuminated reticle projection system can be readily applied or serviced in the field since all the components thereof are externally mounted relative to the objective lens assembly of the night vision equipment.

Accordingly, it is a primary object of the present invention to provide a novel and improved illuminated reticle projection system.

It is another object of the present invention to provide a novel and improved illuminated reticle projection system wherein the reticle image is adjustable in elevation or azimuth or both as necessary and/or desirable.

It is still another object of the present invention to provide a novel and improved illuminated reticle projection system which can be field installed on existing night vision equipment without the necessity of disassembling or otherwise altering the lens assembly of such equipment.

It is a further object of the present invention to provide a novel and improved illuminated reticle projection system wherein the reticle is projected into the entrance pupil of the objective lens of the night vision equipment.

It is a still further object of the present invention to provide a novel and improved illuminated reticle projection system which is simple in construction, easily and inexpensively manufactured, and readily field installed on existing night vision equipment.

These and further objects and advantages of the present invention will become more apparent on reference to the following specification, appended claims and drawings, wherein:

FIGS. 4 and 5 are front and rear views of the illuminated reticle projection system hereof mounted on an objective lens assembly which forms a part of night vision equipment.

Figure 1:
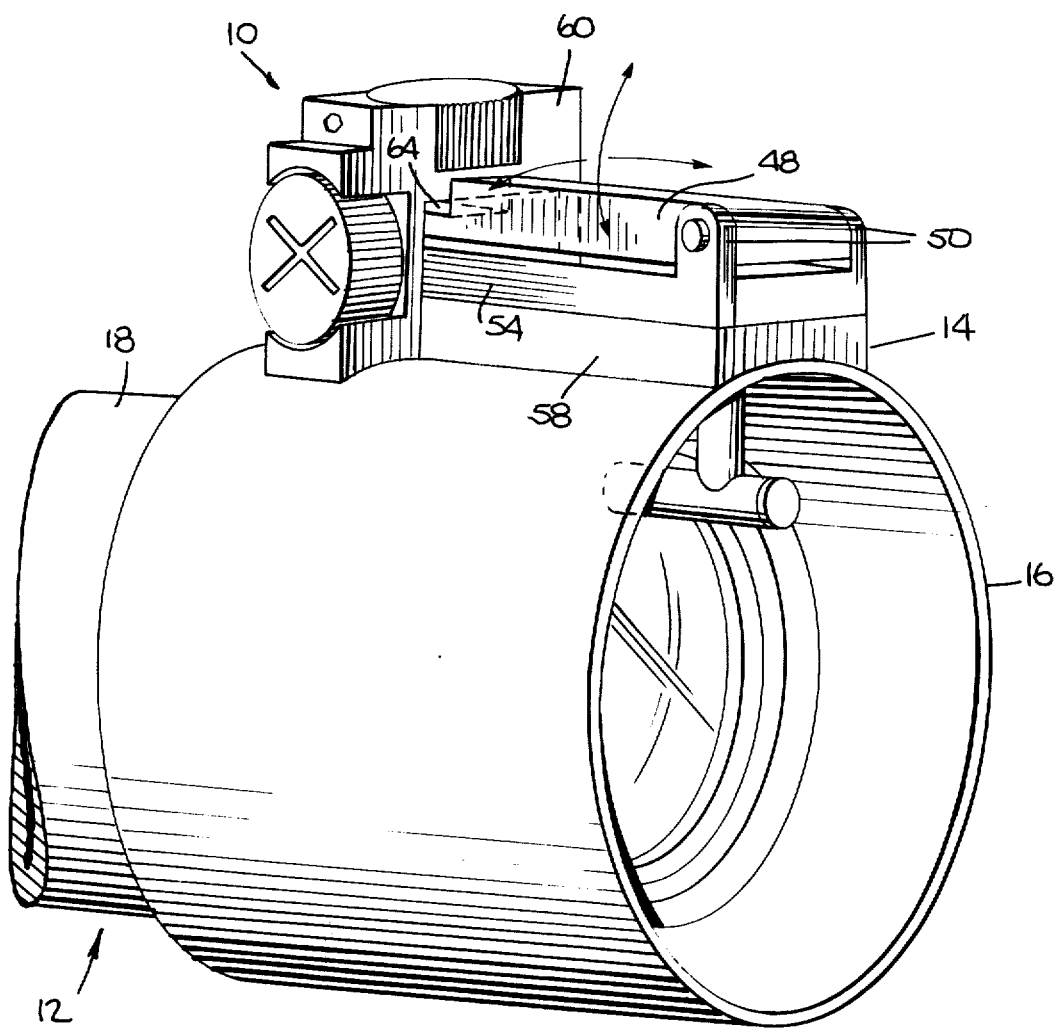
FIG. 1 is a perspective view of an illuminated reticle projection system constructed in accordance with the present invention.
Figure 3:
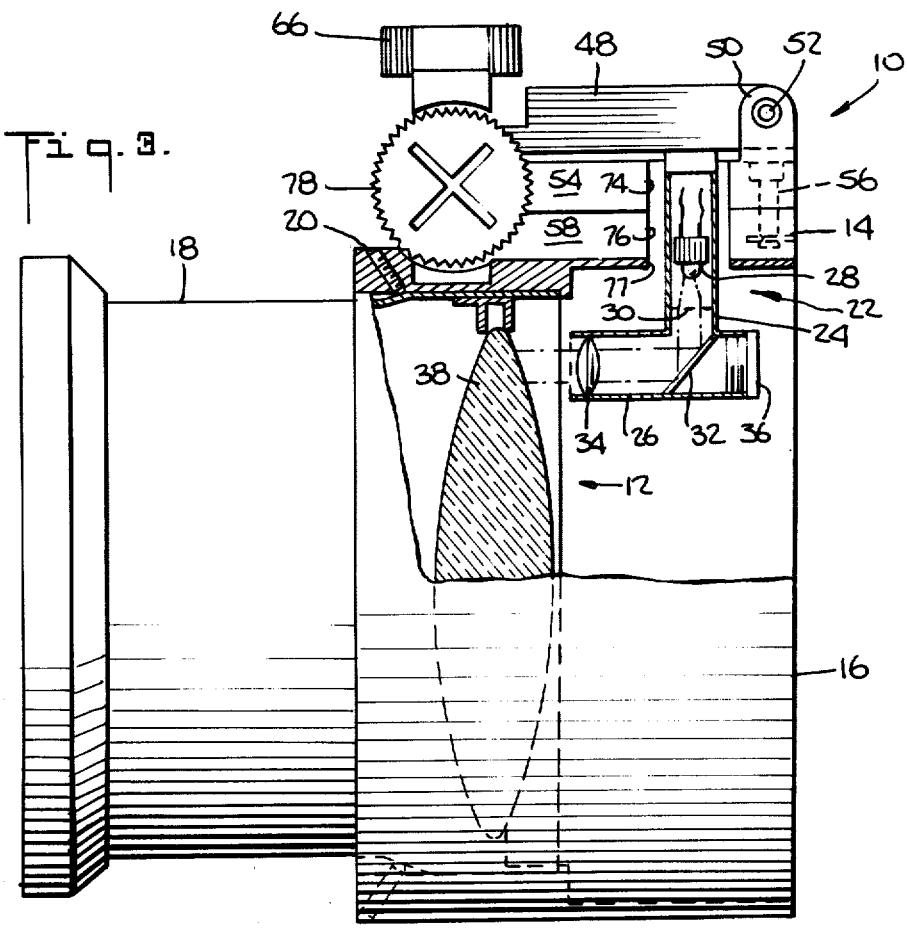
FIG. 3 is a side elevational view thereof with parts broken out and in cross section and also illustrating a portion of the objective lens assembly of the night vision equipment.

Referring now to FIG. 1, there is illustrated an illuminated reticle projection system constructed in accordance with the present invention and generally designated 10. System 10 is mounted on the entrance portion of an objective lens assembly generally designated 12 and which lens assembly 12 forms a part of the night vision equipment, not shown. The projection system is comprised of a frame 14 including an annular housing or casing 16 which is releasably engageable in coaxial relation with the sleeve 18 housing the objective lens assembly 12. As illustrated in FIG. 3, set screws 20 are provided in circumferentially spaced positions about annular housing 16 for releasably securing frame 14 to the objective lens assembly 12.

Referring now to FIG. 3, the illuminated reticle projection system includes a reticle projector, generally designated 22, disposed within a pair of right angularly related tubular housings 24 and 26, respectively. Housing 24 is carried by frame 14 in a manner described below and carries a light source 28, preferably a light-emitting diode. Also within tubular housing 24 is a reticle mask 30 which may be formed of a metal or glass plate (photographically produced) with a transparent reticle formed against an opaque background. At the lower end of the housing 24 there is provided a front surface mirror 32 which bends the light rays from the reticle mask 30, as illuminated by the light source 28, into the entrance pupil of a projection lens 34 carried within tubular housing 26. The opposite end of housing 26 is closed by a cap 36. The projection lens 34 has optical properties such that the reticle image is projected at an infinite conjugate (collimated) into the first objective lens 38 of the objective lens assembly 12.

A power pack generally designated 40 is carried by frame 14 at a position circumferentially spaced about annular housing 16 from reticle projector 22. The power pack includes a battery box 42 with a cap 44 at one end. Cap 44 is screw threaded to the box 42 whereby access to the battery within box 42 is obtained. The light source 28 is electrically connected to the battery within the battery box 42 by a suitable electrical connection, not shown. An on-off potentiometer knob 46 opens and closes the battery circuit with light source 28 and varies the voltage of the light emitting diode whereby the relative brightness of the reticle image can be adjusted and controlled.

The upper end of tubular housing 24 is secured to the underside of an elevation platform 48, one end of which is pivotally mounted between a pair of upstanding ears 50. Elevation platform 48 is thus mounted for pivotal movement in vertical plane and about a generally horizontal axis designated 52. Ears 50 upstand from one end of an azimuth platform 54 which, in turn, is pivotally mounted to the frame 14 by a pin 56 for movement in a horizontal plane about a vertical axis defined by the axis of the mounting pin 56 (see FIG. 3). The mounting pin extends into the base 58 of the frame and is suitably retained therein.

Adjacent the forward end of the reticle projector there is mounted a generally upstanding block 60 having a central aperture or opening 62. The forward end of the elevation platform 48 is stepped downwardly at 64, this lower stepped portion being received within opening 62. An elevation adjustment knob 66 has a shank 68 which is screw-threaded in frame 60 and terminates at its end in engagement against the upper surface of stepped portion 64 of elevation platform 48. An elevation spring 70 is received within a cylindrical opening 72 formed in the upper surface of azimuth platform 54 and bears against the underside of the stepped portion 64 of elevation platform 48 to bias the elevation platform into following engagement with the end of the shank 68 of elevation adjustment screw 66. That is, and with reference to FIG. 3, the elevation platform 48 is biased for movement in a clockwise direction about axis 52 and into following engagement with adjustment screw 66. Also as illustrated in FIG. 3, the tubular housing 24 projects through registering slots 74, 76, and 77 formed through azimuth platform 54, base 58, and annular housing 16 whereby projector 22 extends from elevation platform 48 substantially radially inwardly and within the entrance pupil of objective lens 38.

Figure 2:
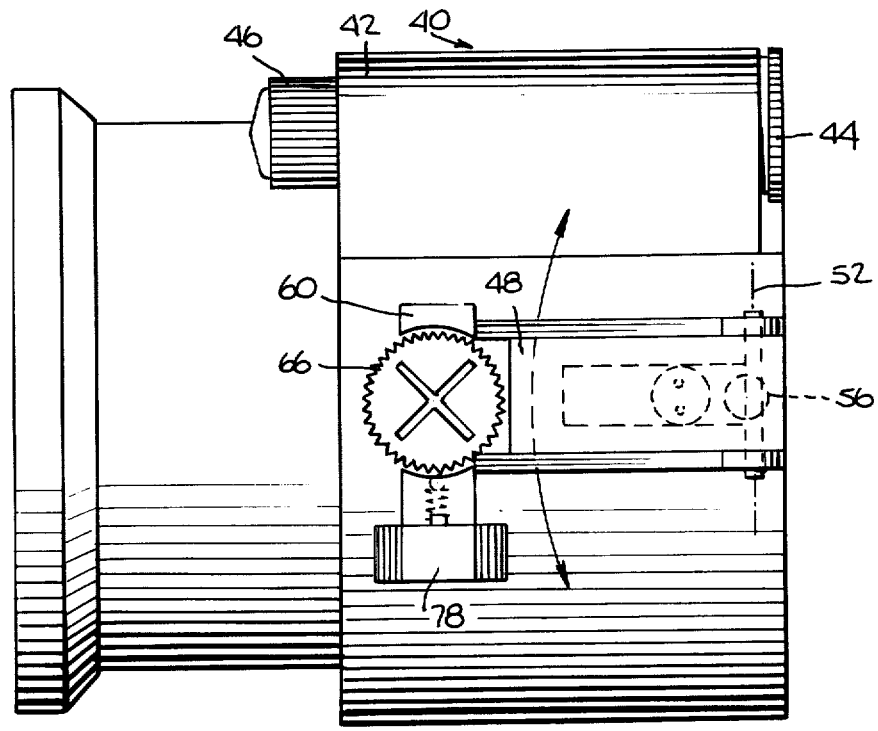
FIG. 2 is a plan view thereof.

An azimuth adjustment screw knob 78 has a shank 80 screw-threaded through the side wall of block 60 for engagement against one side of azimuth platform 54. A spring 82 seats at one end in a cylindrical recess 84 formed on the opposite side of azimuth platform 54. The opposite end of spring 82 bears against the inner wall of block 60. Consequently, spring 82 biases azimuth platform 54 into following engagement with the end of azimuth adjustment screw knob 78. That is, and with reference to FIG. 2, the azimuth platform 54 is biased for counterclockwise movement into following engagement with knob 78. Each of the elevation and azimuth adjustment knobs 66 and 78, respectively, are provided with serrations about their peripheries. Spring biased balls 86 and 88, respectively, engage the serrations of the elevation and azimuth adjustment knobs 66 and 78 providing for quick stop and incremental movement of the knobs and platforms. Consequently, by threading or unthreading azimuth adjustment knob 78, azimuth platform 54 is pivoted in a horizontal plane about a vertical axis defined by pin 56. Since azimuth platform 54 pivotally carries elevation platform 48, the latter and hence the reticle projector 22 carried thereby are also movable in the horizontal plane with azimuth platform 58. By threading or unthreading elevation adjustment knob 66, elevation platform 48 and consequently the projector 22 carried thereby are pivoted in a vertical plane about axis 52. Reticle projector 22 is therefore provided with angular adjustment in both elevation and azimuth.

Figure 6:
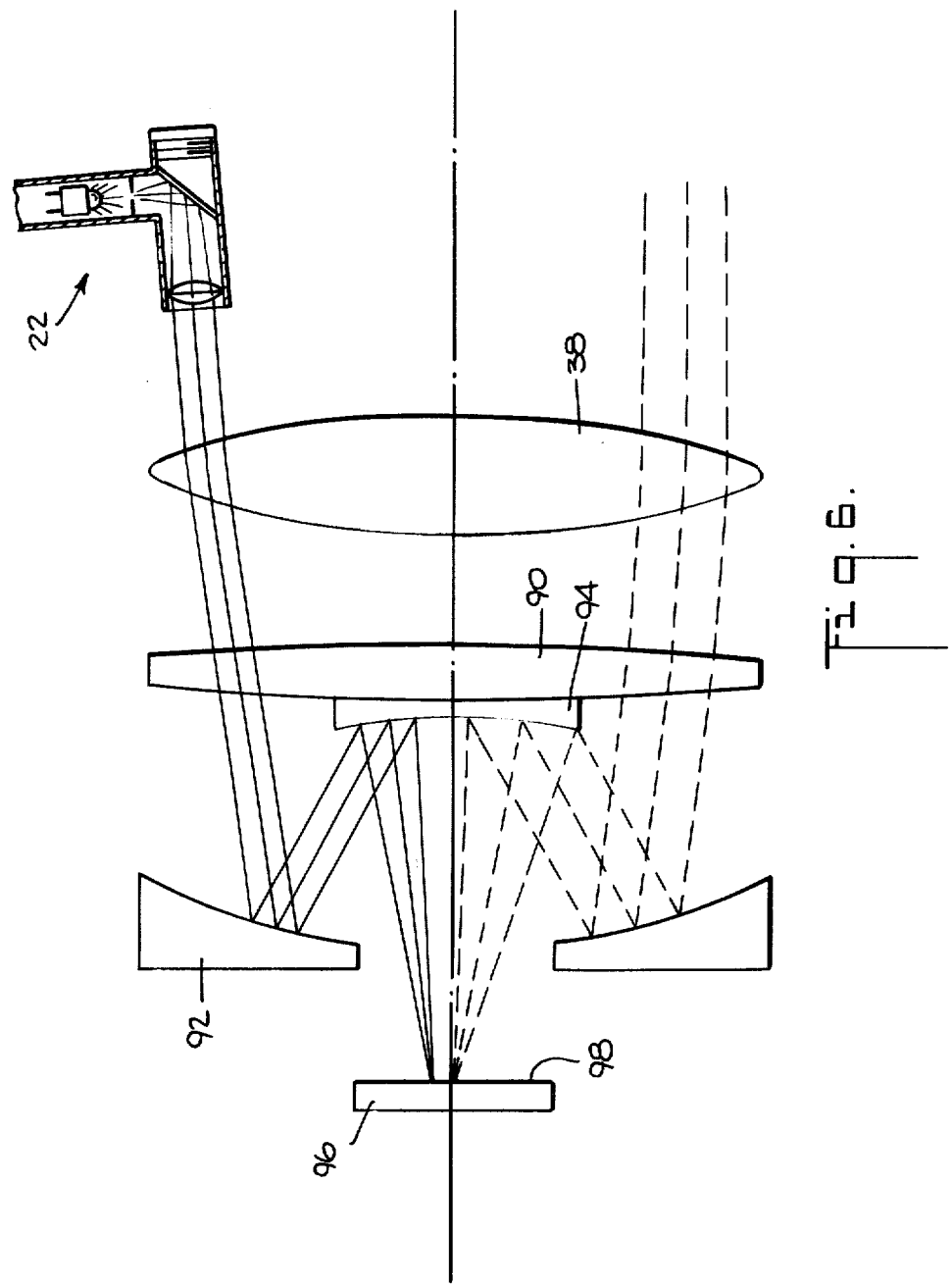
FIG. 6 is a diagrammatic illustration of the illuminated reticle projection system hereof as utilized in a catadioptric objective lens assembly.

An example of the illuminated reticle projection system hereof as utilized with an objective lens assembly of a night vision device is illustrated in FIG. 6, it being appreciated that the particular objective lens assembly is exemplary only and that the illuminated reticle projection system hereof is usable with other types of objective lens assemblies characteristic of other types of night vision equipment. Projection system 10 is first applied to the objective lens assembly of night vision device by concentrically mounting a portion of annular housing 16 about the end of the tubular housing of the objective lens assembly 12. Set screws 50 are utilized to releasably retain system 22 mounted on assembly 12. When assembled as illustrated in FIGS. 3 and 6, the reticle projector 22, and particularly the lower tubular housing 26, is aligned with and adjacent the margin of the objective lens 38 forwardly of its entrance aperture.

In the particular objective lens illustrated in FIG. 6, there is provided a first objective lens 38, a second objective lens 90, an annular mirror 92, a secondary mirror 94 carried on the second objective lens 90, and a fiberoptic photocathode 96 at the image plane 98. With this arrangement, the parallel or collimated rays from the projection lens 34 are projected into the entrance pupil of the objective lens. The full lines represent the light rays from the reticle projection system and it will be appreciated that the objective lens assembly (a catadioptric type being illustrated) brings the parallel rays of light from the projection lens to a point focus at the image plane 98. The dashed lines represent the light rays from the object and it will be seen that the image focus and reticle projection focus coincide at the image plane. From the aforedescribed mounting for reticle projector 22, it will be appreciated that the optical axis of the projection lens can be angularly displaced relative to the optical axis of the objective lens thereby moving the reticle at the image plane vertically and/or horizontally and therefore accomplishing azimuth and/or elevation adjustment as desired.

From the foregoing it will be appreciated that the objects of the present invention are fully accomplished in that there has been provided an illuminated reticle projection system which is externally mounted to the objective lens assembly of a night vision device whereby the disassembly and later reassembly of such objective lens is eliminated. Also, the aforementioned reticle projector can be adjusted in azimuth and elevation as desired and this, in conjunction with its external mounting, facilitates field assembly of the reticle projector and the night vision equipment. Moreover, it will be seen that the foregoing has been accomplished in a comparably inexpensive and readily applied reticle projection system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An illuminated reticle projection system for night vision equipment having an objective lens assembly comprising:

a frame having means for securement to the night vision equipment and carrying a reticle projector including a light source, a reticle mask and a projection lens, said light source being disposed to illuminate said reticle mask to project a reticle image, said projection lens having optical properties to project the reticle image at a substantially infinite conjugate into the entrance pupil of the objective lens assembly, an azimuth platform carried by said frame, means for pivotally mounting said azimuth platform for movement about a vertical axis, an elevation platform carried by said frame, means for pivotally mounting said elevation platform for movement about a horizontal axis, means coupling said reticle projector to one of said azimuth platform and said elevation platform for pivotal movement with said one platform about its axis, the mounting means for said one platform pivotally mounting said one platform to the other of said platforms, the mounting means for the other of said platforms pivotally mounting said other platform to said frame whereby said projector is mounted for pivotal movement with each of said azimuth platform and said elevation platform, and means for adjusting the angular position of each of said elevation platform and said azimuth platform to effect angular displacement of said projector about the respective axes.

2. A projection system according to claim 1 wherein said adjustment means includes:
   i. an azimuth adjustment screw threadedly carried by same frame and engageable with said azimuth platform along one side thereof, means engageable with the opposite side of said azimuth platform for biasing said azimuth platform into following engagement with said screw whereby said azimuth platform is adjustable in opposite angular directions about said axis in response to respective threading and unthreading action of said screw relative to said frame, and
   ii. an elevation adjustment screw threadedly carried by said frame and engageable with said elevation platform along one of the top and bottom surfaces thereof, means engageable with the other of said top and bottom surfaces of said elevation platform for biasing said elevation platform into following engagement with said screw whereby said elevation platform is adjustable in opposite angular directions about said axis in response to respective threading and unthreading action of said screw relative to said frame.

3. A projection system according to claim 1 wherein said frame comprises an annular hood for securement about the objective lens assembly of the night vision equipment, said projector being carried thereby adjacent its periphery and extending substantially radially inwardly to lie in confronting relation with the entrance pupil of the objective lens assembly.

4. An illuminated reticle projection system for night vision equipment having an objective lens assembly comprising:

a frame having means for securement to the night vision equipment and carrying a reticle projector including a light source, a reticle mask and a projection lens, said light source being disposed to illuminate said reticle mask to project a reticle image, said projection lens having optical properties to project the reticle image at a substantially infinite conjugate into the entrance pupil of the objective lens assembly, an azimuth platform, means pivotally connecting said azimuth platform to said frame for pivotal movement about a vertical axis, an elevation platform, means pivotally connecting said elevation platform to said azimuth platform for pivotal movement about a horizontal axis and for pivotal movement of said elevation platform with said azimuth platform about said vertical axis, means coupling said projector to said elevation platform for pivotal movement therewith about said vertical and horizontal axes, and means for adjusting the angular position of each of said elevation platform and said azimuth platform thereby to effect angular displacement of said projector about the respective axes.

5. A projection system according to claim 4 wherein said frame comprises an annular hood for securement about the objective lens assembly of the night vision equipment, said elevation platform being located radially outwardly of said azimuth platform and said hood, said azimuth platform and said hood having radially aligned slots for receiving said projector.

6. A projection system according to claim 5 wherein said light source and said reticle mask are disposed such that the light rays initially projecting the reticle image extend generally radially inwardly, means for deflecting the radially extending light rays to a direction substantially parallel to the axis of the annular hood.

* * * * *